Nov. 24, 1925.  G. M. BRADRICK  1,563,069
GREASE PLUG AND WRENCH
Filed Dec. 13, 1923
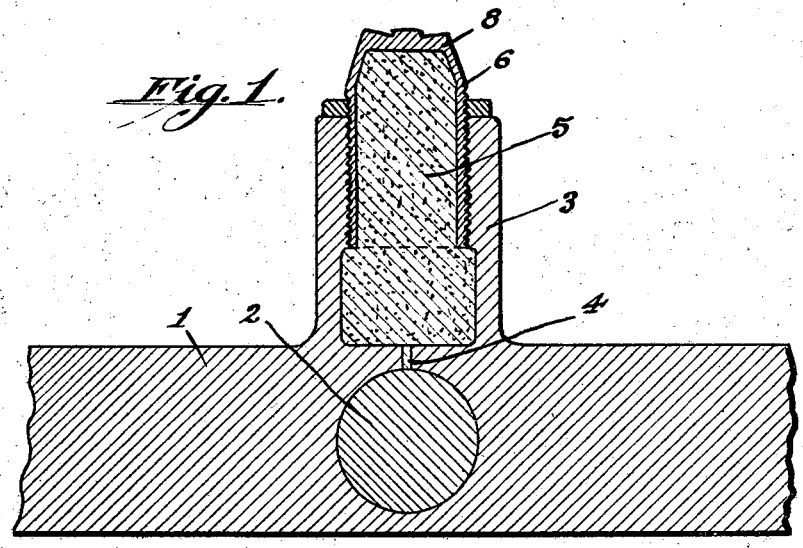
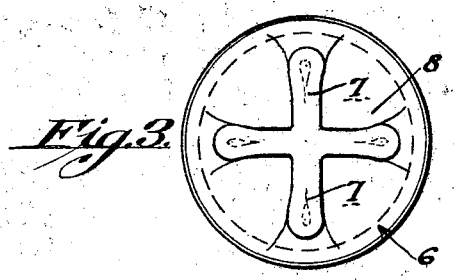
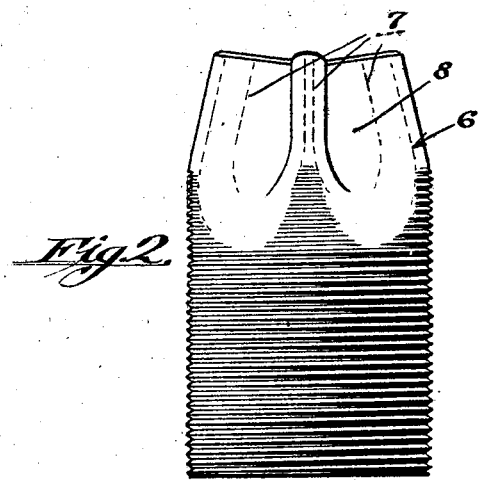
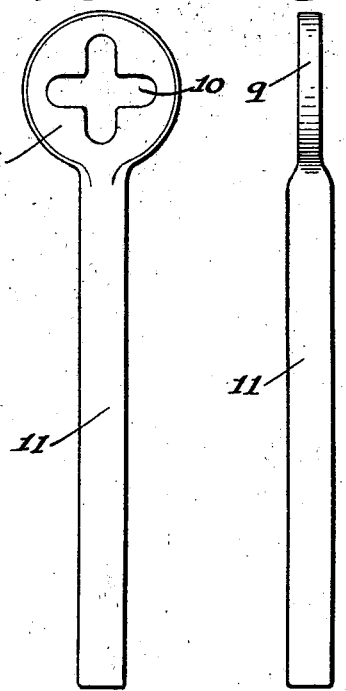
Witness:
W. H. Hall
Inventor:
GEORGE M. BRADRICK.
By Hazard and Miller
Attorneys Patented Nov. 24, 1925.

1,563,069

UNITED STATES PATENT OFFICE.

GEORGE M. BRADRICK, OF LOS ANGELES, CALIFORNIA, ASSIGNOR OF ONE-HALF TO CARMAH E. HODGES, OF SPRINGVILLE, CALIFORNIA.

GREASE PLUG AND WRENCH.

Application filed December 13, 1923. Serial No. 680,403.

*To all whom it may concern:*

Be it known that I, GEORGE M. BRADRICK, a citizen of the United States, residing at Los Angeles, in the county of Los Angeles and State of California, have invented new and useful Improvements in Grease Plugs and Wrenches, of which the following is a specification.

My present invention being referred to as grease plug and wrench, it may be understood that this invention comprises a novel plug for use in grease cups, such as are used in the lubrication of engine parts, and also a wrench especially designed for use therewith.

Having a special reference to grease cups formed integral with the moving parts of locomotives, such grease cups being commonly provided with mere solid plugs, for adjustment therein, in such manner that each plug may serve not only to retain a quantity of grease within the cup but also to force the same into the bearings of side or main rods or other wearing parts, it is an object of this invention to provide a novel plug which, being hollow, may retain a comparative large quantity of lubricating grease and which, being comparatively light, shall be less liable than is a solid plug to be jarred and thrown from its seat during the advance of the locomotive upon which the same may be employed.

It is a further object of this invention to provide a novel grease cup from comparatively inexpensive materials, which may in fact be waste sections of old boiler tubes, or the like, externally threaded at one end and closed at the other end by mere crimping or by crimping and welding in a simple manner, the mentioned crimping being such as to contribute to the retention of the plug within a grease cup and also such as to facilitate the use of a novel wrench, adapted to interfit with the crimped end of said plug.

As indicated above, the objects of my invention thus comprise the production of a self-retaining grease cup of comparatively large capacity from inexpensive materials. A preferred embodiment of my invention in plugs for grease cups may be not only reliably self-retaining but also, to a large extent, self-feeding, the increased volume of grease confined within the same having the tendency, when such grease is warmed up during the operation of an engine, to force suitable quantities of the lubricant therefrom into a bearing with which the grease cup may be connected; and, although my novel grease plug may not require the employment of a lock nut to aid in its retention, the relatively simple preferred construction of my novel grease cup is such as to permit the optional use of an ordinary lock nut therewith.

Other objects of my invention will appear from the following description of a preferred embodiment thereof, and from the appended claims, taken in connection with the accompanying drawings, in which, Fig. 1 is a diagrammatic section through a bearing provided with a grease cup in which a plug of my novel design is employed.

Fig. 2 is an elevational view of a plug of the character shown in Fig. 1.

Fig. 3 is a plan view showing the outer end of the same plug.

Figs. 4 and 5 are respectively self-explanatory views, at right angles of one another, of a wrench suitable for use in connection with the plug disclosed in Figs. 2 and 3.

Referring to the details of that specific embodiment of my invention chosen for purpose of illustration, being a side or main rod or other part of a locomotive, or the like, through which extends a pin or shaft or similar element, moveable therein and requiring lubrication, 3 may be a grease cup, which may be threaded or otherwise secured to the rod 1, but which is preferably integral therewith, as shown, and is provided at its bottom with a duct or passage 4, through which grease 5, or its equivalent, may be delivered upon the bearing surface of the pin or shaft 2.

Coming now to the strictly novel features of my invention, it being usual to employ a mere solid plug to confine grease within a cup of the character referred to, I replace the solid plug referred to by a hollow plug, exteriorly threaded at its lower end.

Regardless of the specific construction of the outer end plug referred to, the use of a hollow plug is advantageous in permitting a cup of predetermined size to co-operate therewith in the retention of a comparatively large volume of grease, this retention of a large volume being of importance not only as obviating the necessity of frequent replenishment of the supply of grease or other lubricant but also as tending, by reason of a greater relative expansion which results from the mentioned increase in volume, to render the delivery of grease through the duct 4 practically continuous and automatic, heat imparted to the entire organization during the operation of the locomotive being sufficient to cause a partial or complete melting and expansion and agitation of the grease sufficient to insure continuous and satisfactory lubrication even to the end of a comparatively long run.

In order to provide a hollow plug 6 of the type referred to with a head at its outer end sufficiently rugged to permit of the application of a wrench thereto, and in order to effectively close the outer end, and in order to permit of the utilization of short or scrap pieces of pipe or tubing in the construction of my hollow plugs, I prefer to complete the same by deforming the outer end of each plug, assuming the same to have been originally circular in cross section throughout its length, in a manner best shown in Figs. 2 and 3, this deformation being preferably such as to give the end of each plug a configuration resembling a Maltese cross or star, any liability to leakage being preferably obviated by a final electrical or other welding, this being preferred to mere soldering to close seams 7 in the head 8. By the deformation and welding referred to, a grease-tight hollow plug may be formed very simply and expeditiously from inexpensive material, and not only the lightness of the plug but the slight incidental deformation of the outer portion of the threaded body thereof may contribute to the secure retention of said plug within a cup 3, although permitting of a ready removal thereof upon the application of a suitable wrench, one advantageous type of wrench being shown in Figs. 4 and 5 as comprising a head 9 provided with aperture 10 substantially in the form of a Maltese cross or star, and adapted to interfit with the outer end 8 of a plug 6, handle 11 of said wrench being of any usual or preferred form.

Although I have herein described one complete embodiment of my invention, it will be obvious that a hollow plug of the general character described may be formed in various ways, and also that various features of my invention might be independently employed, without involving a departure from the sphere and scope of my invention as the same is indicated above and in the following claims.

What I claim is:

1. In a lubricating device, a grease cup provided with a hollow plug consisting of a section of piping exteriorly threaded at its inner end and closed at its outer end by deformation into a form resembling a cross or star.

2. In a lubricating device, a grease cup provided with a hollow plug consisting of a section of piping exteriorly threaded at its inner end and closed at its outer end by deformation into a form resembling a cross or star.

3. A hollow grease plug consisting of a piece of pipe externally screw threaded and having one end crimped into a form resembling a cross or a star and welded to close the end.

4. A hollow grease plug consisting of a piece of pipe externally screw threaded and having one end crimped and welded to close the end, the crimping extending to the screw threading serving to deform the upper ends of the threads so they will jam when screwed into a cup to hold the plug from unscrewing.

In testimony whereof I have signed my name to this specification.

GEORGE M. BRADRICK.